United States Patent Office 3,137,220
Patented June 16, 1964

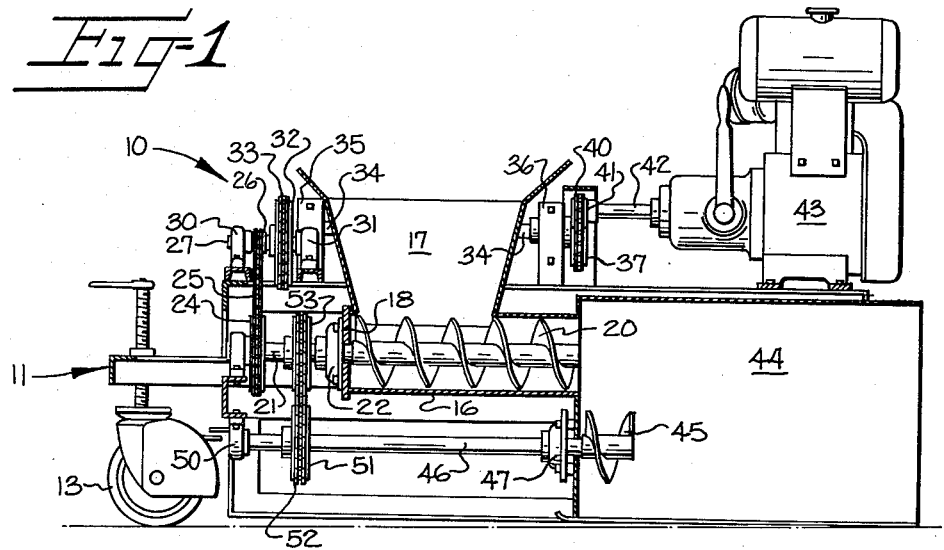

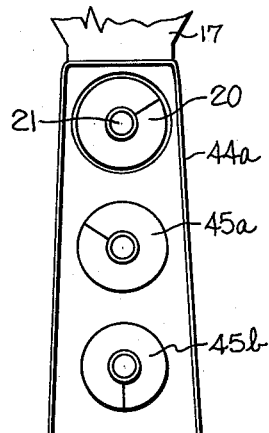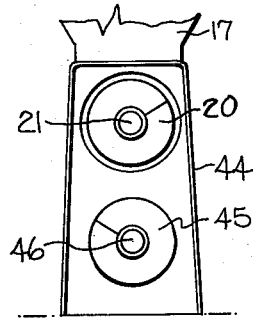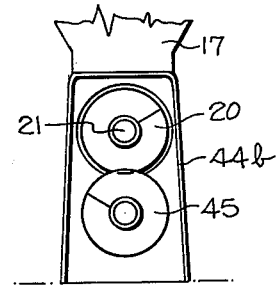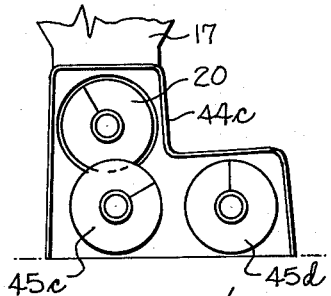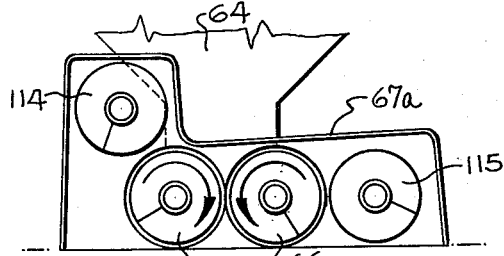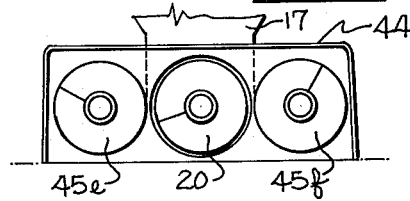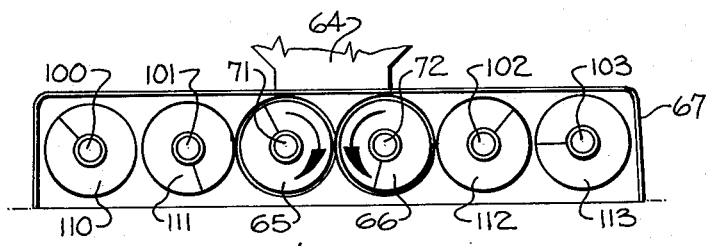

3,137,220
FEEDING MEANS FOR CURB LAYING MACHINE
Roy W. Smith, Salisbury, N.C., assignor to Power Curbers, Inc., Salisbury, N.C., a corporation of North Carolina
Filed Feb. 10, 1961, Ser. No. 88,333
10 Claims. (Cl. 94—46)

This invention relates to machines for laying strips of paving material, such as slabs, curbs, or curbs and gutters or the like, and is particularly concerned with improvements in machines of the character disclosed in a patent to William E. Canfield, Patent No. 2,707,422, issued on May 3, 1955, and a patent to William E. Canfield and Roy W. Smith, Patent No. 2,818,790, issued on January 7, 1958.

The machine disclosed in Patent No. 2,707,422 generally comprises a horizontally disposed tube above one end of which a hopper is disposed and within which a driven screw is disposed for propelling and compressing material, directed into the tube from the hopper, rearwardly through said tube. The rear end of the tube has an elongated mold connected thereto and communicating therewith. The mold has an open bottom and an open rear end whereby paving material extruded by the screw from the tube is formed according to the shape of the mold and molded upon the surface upon which the machine is positioned. The machine is propelled due to the thrust of the screw in compressing the paving material against the material already in the mold.

The machine disclosed in Patent No. 2,818,790 generally comprises a first horizontally disposed tube above one end of which a hopper is disposed and within which a driven screw is disposed for propelling and compressing the material, directed into the tube from the hopper, rearwardly through said tube. A manifold is positioned at the rear end of said first tube to receive paving material therefrom. The manifold communicates with a second plurality of tubes disposed on a lower level than the first tube and serves to meter the flow of paving material from the first tube to the second plurality of tubes. Each of said second plurality of tubes has a driven screw therein for compacting and extruding paving material therefrom. A common open bottom mold communicates with the rear ends of the second plurality of tubes and is open at its rear end whereby a relatively wide or expansive section of paving may be molded thereby.

The mold associated with the machine disclosed in Patent No. 2,707,422 is necessarily limited in size in direct proportion to the size of the feed screw. This limitation on the size of a mold which may be used with any given size of feed screw is occasioned by a principle referred to hereafter as "controlled expansion." In any extrusion device which extrudes solids, the material is placed under compressive pressure in the extrusion passageway by the action of friction retarding the passage of the material through the extrusion passageway and the action of the feeding means moving the material through the passageway. Once the material is forced out of the confines of the extrusion passageway, the compressive pressure thereon is released since there is no longer a frictional force retarding the outward movement of the material which allows the material to expand. If the expansion of the material is unrestrained, it will expand in all directions in substantially the same shape as the extrusion passageway.

The expansion of the material as it leaves the extrusion passageway causes the material to assume the size and shape of any mold or other restricting means provided the size of the mold or restricting means is of a cross-sectional area equal to or less than the area of expansion of the material. This is occasioned by the mold restricting the expansion of the material in all directions, but more in some directions than in others such that the material expands along the lines of least resistance to thus assume the shape of the mold.

If the cross-sectional area of the mold exceeds the area of expansion of the material, the expansion of the material is unrestrained or uncontrolled and the material will not assume the shape of the mold immediately upon its exit from the extrusion passageway. Before the material will assume the shape of the mold, there must be some outside force applied thereto which will distribute the material throughout the mold.

The use of a mold larger than the area of expansion of the extruded material has not heretofore been possible since no feasible means for distributing the material throughout the cross-sectional area of the mold has been developed which would at the same time pack the material into the mold with substantially the same degree of compactness outside of the area of expansion of the material as the degree of compactness within the area of expansion of the material. The reduction in the degree of compaction of the paving material in the area outside of the area of expansion of the material has heretofore caused the strip of paving material laid by prior extruding devices not to conform to the required specifications and to break down under either their own weight or stresses applied thereto.

The machine disclosed in Patent No. 2,818,790 was an improvement over the prior machine disclosed in Patent No. 2,707,422 in that the machine could lay a strip of paving material of a much greater expanse and height. This was accomplished by providing a plurality of screws feeding into the mold as opposed to the single screw of the machine in Patent No. 2,707,422. The plurality of screws gave a much greater total area of expansion since each feed screw and corresponding tube extruded material which expanded over an area directly proportional to the size of the screw and tube. The sum of the plurality of areas of expansion gave a total area of expansion much greater than was possible in the prior machine. The plurality of screws extruded a greater volume of material than would have been possible with a single screw permitting the use of a substantially larger mold.

The machine disclosed in Patent No. 2,818,790 is also limited in the size of paving strip which it can lay because the number of feeding screws is limited. The limitation on the number of feed screws is occasioned by the fact that the paving material must be metered such that each screw will receive an amount proportionate to the size of the area of the mold in which it is disposed. This metering of the paving material is necessary to insure that each area of the mold is filled with paving material and compacted to substantially the same degree of compaction.

The addition of a plurality of feeding screws and a device for metering the paving material thereto renders the apparatus more complicated with consequent increased cost of construction and increased problems of adjustment and maintenance. Also, the weight and size of the apparatus is substantially increased giving less mobility.

The apparatus of the present invention was developed to obviate the aforementioned difficulties. To accomplish this end, there is provided a framework having a hopper thereon into which any suitable paving material may be dumped. The hopper is disposed upon and communicates with a tube in which a driven auger or screw is provided for propelling the paving mixture rearwardly through said tube and into a mold. Said mold has an open bottom and rear end whereby the paving material extruded by the auger from the tube is formed according to the shape of the mold and molded upon the surface upon which the machine is positioned.

At least one auxiliary auger or screw is disposed within the mold laterally of the rear end of the tube in which the feed auger is disposed and is driven from the drive for the feed auger. It has been determined that the auxiliary auger may be driven at any desired speed to accomplish the desired results of distribution and compaction of the material within the mold. Since the auxiliary auger rotates within the mold in an unrestrained condition, the auxiliary auger will receive paving material from the feed auger when the same is extruded from the rear end of the tube. The auxiliary auger will distribute and compact the paving material in the area of the mold in which it is disposed to provide substantially the same degree of compactness in that area as is achieved by the feed screw in its area.

The use of the auxiliary auger disposed within the mold allows a much higher or wider strip of paving material to be laid using a single feed auger than has heretofore been possible since the cross-size of the mold is not limited by the area of expansion of the extruded material and can be several times greater than the cross-sectional size of the feed auger because the auxiliary auger aids in the distribution and compaction of the paving material over a much greater area than is possible with the single feed auger. For the same reasons, the use of the auxiliary auger allows both a curb and a gutter to be laid using a single feed auger which was not heretofore possible.

The term "paving material" as used herein not only includes concrete, asphalt or the like, but any suitable mastic material capable of being excluded in the disclosed apparatus.

It is therefore an object of this invention to provide an improved apparatus for laying substantially uniformly compacted strips of paving material, such as curbs, curbs and gutters, slabs and the like, of a larger cross-sectional area than has heretofore been possible utilizing a feed auger of a particular size.

A more specific object of this invention is to provide an improved apparatus capable of laying strips of paving material of a larger cross-sectional area than the area of expansion of the paving material being extruded from the feed tube while maintaining the density of the paving material throughout the cross-sectional area of the strip substantially uniform.

A still more specific object of the present invention is to provide an improved apparatus for laying substantially uniformly compacted strips of paving material wherein the cross-sectional area of the mold is no longer restricted by the size of the feed auger used to feed the paving material into the mold whereby paving strips of considerably larger sizes may be laid thereby.

Another object of the present invention is to provide an improved apparatus for laying substantially uniformly compacted strips of paving material having a feed auger for feeding paving material into a mold and at least one auxiliary auger disposed within the mold for distributing and compacting the material therein whereby paving strips of considerably larger cross-sectional area may be laid than has heretofore been possible.

A more specific object of the present invention is to provide an improved apparatus for laying substantially uniformly compacted strips of paving material having one or more auxiliary augers disposed within the mold for allowing use of a mold of substantially greater cross-sectional area than the area of expansion of the paving material being extruded by the feed auger so that the size of the mold is no longer restricted by the size of the feed auger.

Some of the objects of the invention having been stated, other objects will appear as the description proceeds, when taken in connection with the accompanying drawings, in which—

FIGURE 1 is a longitudinal vertical section of one embodiment of the apparatus of the present invention;

FIGURE 2 is a top plan of another embodiment of the apparatus of the present invention with portions broken away for clarity;

FIGURE 2A is a fragmentary perspective view showing the drive for the apparatus shown in FIGURE 2;

FIGURES 3 through 5 are somewhat schematic views of several sizes of molds for laying curb like-strips of paving material and different arrangements of the augers therein which may be used with the apparatus shown in FIGURE 1;

FIGURE 6 is a somewhat schematic view of a mold for laying curb and gutter type strips of paving material and the arrangement of the augers therein which may be used with the apparatus shown in FIGURE 1;

FIGURE 7 is a somewhat schematic view of a mold of the type shown in FIGURE 6 and the arrangement of augers therein which may be used with the apparatus shown in FIGURE 2;

FIGURE 8 is a somewhat schematic view of a mold for laying rectangular strips of paving material and the arrangement of augers therein which may be used with the apparatus shown in FIGURE 1; and FIGURE 9 is a somewhat schematic view of a mold of the type shown in FIGURE 8 and the arrangement of augers therein which may be used with the apparatus shown in FIGURE 8.

Referring now to the drawings, wherein like reference characters designate like or corresponding parts throughout the several views, there is shown in FIGURE 1 an apparatus for extruding strips of paving material and embodying the present invention and generally indicated at 10 and comprising a frame 11 supported on a surface such as the ground or the like by four wheels 12, 13, 14 and 15. A tube 16 is mounted on the frame 11 and has an opening adjacent its forward end for the reception of the open bottom of a suitable hopper 17 mounted thereon. The forward end of tube 16 is closed by an end plate 18 while the rearward end remains open.

A suitable feed auger or screw 20 is disposed within tube 16 and extends for substantially the entire length thereof. A shaft 21 is integrally formed with or fixedly connected to feed auger 20 and extends through the forward end of tube 16. Shaft 21 is journaled for rotation in a bearing 22 mounted on end plate 18 of tube 16 and in a bearing 23 mounted on the frame 11.

A sprocket 24 is drivingly mounted on shaft 21 and supports one end of a sprocket chain 25. A sprocket 26 is mounted on a shaft 27 and supports the other end of chain 25 in driving relation. Shaft 27 is journaled for rotation in suitable bearings 30, 31 mounted on the frame 11. A sprocket 32 is drivingly mounted on shaft 27 and supports one end of a chain 33. The other end of chain 33 is drivingly supported by a sprocket (not shown) mounted on a shaft 34. Shaft 34 is journaled for rotation in suitable bearings (not shown) carried by suitable standards 35, 36 mounted on the frame 11. A sprocket 37 is drivingly mounted on the shaft 34 and supports one end of a chain 40. A sprocket 41 is mounted on the output shaft 42 of a suitable motor 43 and drivingly supports the other end of chain 40. Motor 43 may be of any conventional type but is shown herein in the form of an internal combustion engine supported on the frame 11.

A suitable mold 44 is carried by frame 11 and has an open bottom adjacent the surface on which the apparatus 10 is supported. Mold 44 also has an open rear end and a forward end communicating with the rear end of tube 16. Preferably, mold 44 has a cross-sectional area materially greater than the cross-sectional area of the rear end of tube 16.

An auxiliary auger 45 is disposed within the mold 44 vertically below and alined with the feed auger 20. A shaft 46 is formed integrally with or fixedly connected to the auxiliary auger 45 in driving relation thereto. Shaft 46 is journaled for rotation in a bearing 47 mounted on the forward end of mold 44 and a bearing 50 mounted on frame 11. A sprocket 51 is drivingly mounted on shaft 46 and supports one end of a sprocket chain 52. A sprocket 53 mounted on shaft 21 for rotation therewith drivingly supports the other end of sprocket chain 52.

Referring to FIGURES 3–5, a plurality of different sized molds and arrangements of feed and auxiliary augers are shown for forming curbs of different heights and widths. In FIGURE 3, a mold 44a is shown of relatively large vertical height having the feed auger 20 disposed adjacent the top thereto with a pair of auxiliary augers 45a and 45b disposed therebelow. Feed auger 20 is adapted to extrude paving material into the mold and compact the same in the upper portion of mold 44a. Auxiliary augers 45a and 45b are adapted to receive paving material from feed auger 20 and compact the same in the areas of mold 44a in which they are disposed such that a paving strip of substantial uniform compactness is obtained.

In FIGURE 4, the mold and auger arrangement shown in FIGURE 1 is shown in end elevation with the feed auger 20 disposed adjacent the top of the mold 44 with auxiliary auger 45 disposed therebeneath for forming curbing of less vertical height than the mold and auger arrangement shown in FIGURE 3. A different size mold and different auger arrangement is shown in FIGURE 5 wherein the mold 44b is of less height than the molds 44a and 44 shown in FIGURES 3 and 4, respectively, and of less width with feed augers 20 disposed adjacent the top and auxiliary auger 45 disposed therebeneath with a portion thereof overlapping the feed auger 20.

Referring to FIGURE 6, an arrangement is shown wherein a mold 44c is provided of a shape to allow the apparatus 10 to lay a combined curb and gutter. In this arrangement, the auger arrangement is such that the feed auger 20 is positioned in the upper portion of the mold which corresponds to the upper portion of the curb with an auxiliary auger 45c disposed therebeneath with a portion overlapping the feed auger 20 and with a second auxiliary auger 45d disposed beside the first auxiliary auger in the portion of the mold which would correspond to the gutter portion of the curb and gutter strip of pavement. In FIGURE 8, an arrangement is shown for laying substantially rectangular strips of paving material wherein a mold 44d is provided of substantially rectangular shape with the feed auger 20 disposed in the central portion thereof with auxiliary augers 45e and 45f disposed on either side in substantially horizontal alinement therewith.

While only five arrangements of different types, shapes and sizes of molds have been shown using the single feed auger 20 and one or more auxiliary augers 45, it is apparent that other arrangements of different sizes and shapes of molds and different auger arrangements may be made within the scope of the present invention by one skilled in the art without departing from the spirit thereof.

In operation, paving material is placed within the hopper 17 and is fed by the force of gravity downwardly into the tube 16. Feed auger 20 moves the paving material rearwardly in the tube 16 into the mold 44. As the paving material is moved rearwardly in tube 16, the same passes through a portion of the tube which completely encloses feed auger 20. Due to the frictional force generated by contact of the paving material with the tube which retards the movement of the paving material and the force of feed auger 20, the paving material is compacted within this portion of the tube such that when the paving material is moved into the mold the paving material will expand outwardly filling the area of the mold rearwardly of the feed auger.

Auxiliary auger 45 receives the expanding material from the feed auger 20 and fills and compacts the same into the area of the mold 44 in which it is disposed to substantially the same degree of compaction as the area rearwardly of the feed auger 20. If more than one auxiliary auger is used, each will fill and compact the respective area in which it is disposed to substantially the same degree of compaction as the feed auger will compact its respective area.

It will therefore be seen that a substantially larger strip of paving material of varying shapes may be extruded than has heretofore been possible. Also, the paving material in such strips is of substantially the same density throughout the cross-sectional area of the strip giving a stronger strip of increased resistance to wear, breakage, etc.

Referring to FIGURES 2 and 2a, another apparatus for extruding strips of paving material embodying the present invention is generally indicated at 60. Apparatus 60 comprises a frame 61 which supports a pair of tubes 62, 63 thereon disposed in side by side juxtaposed relationship. Tubes 62, 63 extend rearwardly of frame 61 in substantial horizontal alinement and have openings therein communicating with the open bottom of a suitable hopper 64. A pair of feed augers 65, 66 are disposed in tubes 62, 63, respectively, for moving the paving material from the area beneath the hopper 64 rearwardly into a mold 67. Preferably, mold 67 has a cross-sectional area several times greater than the cross-sectional area of the rear ends of tubes 62, 63 as is clearly shown in FIGURE 9.

A shaft 70 is formed integrally with or fixedly connected to feed auger 65 and has a sprocket 71 drivingly mounted thereon. A shaft 72 is formed integral with or fixedly connected to feed auger 66 and has a drive sprocket 73 drivingly mounted thereon. A stub shaft 74 is journaled for rotation in a suitable bearing 75 fixed to the forward end plate of the tube 63 and has a sprocket 76 mounted thereon for rotation therewith. Shafts 70, 72 are journaled in suitable bearings 77, 78 mounted on the front end plates of the tubes 62, 63, respectively.

A sprocket chain 80 is supported at one end by sprocket 71 on shaft 70 and at the other end by sprocket 76 mounted on the stub shaft 74. The lower portion of chain 80 engages the upper portion of sprocket 73 such that the feed augers 65 and 66 are counter-rotating in the respective tubes 62, 63. The counter-rotation of the feed augers 65, 66 will tend to draw the paving material into the tubes 62, 63 between the shafts of the augers. While counter-rotation of feed augers 65, 66 is preferred, it is contemplated that the same may be driven in the same direction or in any suitable manner without departing from the spirit of the instant invention.

As shown in the drawings, the two augers are counter-rotating and intercommunicating in the area of the transfer of the paving material from the hopper to obviate the necessity of a metering device with a consequent decrease in complexity and cost of operation and construction. Also, for any given mold height, wider and more expansive strips of paving material may be laid by the use of two augers since a greater volume of paving material may be extruded thereby than could be extruded by a single auger since the two tubes are positioned in horizontal alinement and consequently larger diameter augers may be used.

Shaft 70 has a drive sprocket 81 drivingly mounted thereon which supports one end of a chain 82. A sprocket 83 mounted on a shaft 84 drivingly supports the other end of chain 82. Shaft 84 is journaled for rotation in suitable bearings 85, 86 mounted on the frame 61 and mold 67, respectively. A sprocket 87 is drivingly mounted on shaft 84 and supports one end of a chain 90, the other end of which is drivingly supported by a sprocket 91 mounted on the output shaft 42 of motor 43.

A sprocket 92 is mounted on shaft 84 for rotation therewith and drivingly supports one end of a chain 93 thereon. Chain 93 is supported along its length by sprockets 94, 95, 96 and 97 mounted on shafts 100, 101, 102 and 103, respectively. Shafts 100, 101, 102 and 103 are journaled for rotation in suitable bearings 104, 105, 106 and 107 mounted on the front of mold 67 and in suitable bearings (not shown) mounted on frame 61 and drivingly support auxiliary augers 110, 111, 112 and 113, respectively, for rotation therewith within the mold 67.

Referring now to FIGURE 7, an arrangement is shown wherein the apparatus 60, shown in FIGURE 2, is provided with a mold 67a in the shape required for the laying of a combination curb and gutter with the pair of counter-rotating feed augers 65, 66 disposed in the central portion of the mold with an auxiliary auger 114 positioned in the upper or curb portion of the mold and a second auxiliary auger 115 disposed in the outer gutter portion of the mold. The mold and arrangement of augers shown in FIGURE 9 corresponds to that shown in FIGURE 2 wherein the feed augers 65, 66 are disposed in the central portion of the mold 67 which is shaped for the laying of a substantially rectangular strip of paving material with the auxiliary augers disposed on opposite sides of the two feed augers.

While feed augers 20, 65 and 66 are shown as terminating at the open rear end of tubes 16, 62 and 63, it is contemplated that the same may be extended rearwardly of the open rear end of the tubes into the molds 44 and 67. The extension of the feed augers into the molds aids in the distribution of the material to the auxiliary augers.

In operation, paving material is placed in the hopper 64 and is fed by gravity downwardly through the open bottom thereof into the tubes 62, 63 between the counter-rotating feed augers 65, 66. The feed augers 65, 66 draw the paving material downwardly therebetween and move the same rearwardly through the respective tubes 62, 63. It is noted that each of the tubes 62, 63 have a portion adjacent their rear ends which completely enclose the respective augers 65, 66 for a distance at least equal to one flight of the augers. The paving material is compacted in these portions of tubes 62, 63 such that the material is under pressure when it reaches the open rear end of the tubes.

In all embodiments, the paving material is moved rearwardly out of the open rear ends of the tubes by the corresponding feed augers into the mold. Once out of the confinement of the tubes, the paving material expands filling the area immediately rearwardly of the feed auger or augers with paving material. When this area is filled, the paving material spreads laterally outwardly thereof and is picked up by the auxiliary augers. Each individual auxiliary auger fills its corresponding area with paving material and then the paving material is picked up by the next succeeding auger until all areas of the mold are filled and compacted to substantially the same degree of compactness throughout the entire cross-sectional area of the strip of paving material.

When each area of the mold is filled and compacted with paving material, the auxiliary augers refuse to receive any more paving material from the feed augers since the paving material is compacted between the flights thereof and the material has no place to be moved by the auxiliary augers. At this time, the force of the paving material being moved into the mold by the corresponding feed auger or augers exceeds the resistance to forward movement of the machine and the machine is moved forwardly over the surface. Once the machine has moved away from the previously compacted mass, the auxiliary augers again begin to receive paving material from the feed augers and fill their respective areas and compact the same to substantially the same degree of compactness as the feed augers compact their respective areas of the strip of paving material.

It is thus apparent from the foregoing description of the operation of the auxiliary augers, that these augers serve as metering devices to control the amount of material distributed and compacted thereby. In this sense, these auxiliary augers may be termed "automatic metering devices" for controlling the distribution and compaction of the material in the mold.

It will therefore be apparent that substantially more versatility in the size and shape of the strips of paving material laid by the apparatus may be achieved through the use of the auxiliary augers. This versatility is achieved because the auxiliary augers extend the area of controlled expansion which is necessary for paving material to be extruded as formed strips of paving material.

In the drawings and specification there have been set forth preferred embodiments of the invention and, although specific terms are employed, they are used in a generic and descriptive sense only and not for purposes of limitation, the scope of the invention being defined in the claims.

I claim:

1. Apparatus for forming raised strips of paving material of substantially uniform density on a surface, said apparatus comprising
   (a) an elongate frame,
   (b) an open bottom hopper mounted on said frame into which paving material is adapted to be placed,
   (c) a horizontally disposed feed tube carried by said frame and extending longitudinally thereof, the forward end portion of said tube being disposed below the hopper and communicating therewith and the rear end of said tube being open,
   (d) an elongate mold mounted on said frame rearwardly of said hopper and having top and side walls defining a confined space open at the bottom and rear end thereof and of a cross-sectional configuration corresponding to the desired configuration of the raised strips of paving material and a cross-sectional area materially greater than the cross-sectional area of said tube, said mold communicating with the open rear end of said tube between the top wall and open bottom thereof,
   (e) feed means disposed in said tube for feeding paving material from said hopper into said mold under pressure, and
   (f) distributing and compacting auger means disposed within said confined space in said mold and laterally offset from the open rear end of said tube and extending longitudinally of the mold for a distance less than the length of the mold for receiving paving material fed into said mold by said feed means and cooperating with said feed means to distribute the paving material throughout the confined space within said mold and to compact the paving material in said mold to substantially uniform density.

2. Apparatus for forming raised strips of paving material of substantially uniform density on a surface, said apparatus comprising
   (a) an elongate frame,
   (b) an open bottom hopper mounted on said frame into which paving material is adapted to be placed.
   (c) a horizontally disposed feed tube carried by said frame and extending longitudinally thereof, the forward end portion of said tube being disposed below the hopper and communicating therewith and the rear end of said tube being open,
   (d) an elongate mold mounted on said frame rearwardly of said hopper and having top and side walls defining a confined space open at the bottom and rear end thereof and of a cross-sectional configuration corresponding to the desired configuration of the raised strips of paving material and a cross-sectional area materially greater than the cross-sectional area of said tube, said mold communicating with the open rear end of said tube adjacent the top wall thereof and between the top wall and open bottom thereof,
   (e) feed means disposed in said tube for feeding paving material from said hopper into said mold under pressure, and (f) distributing and compacting auger means disposed within said confined space in said mold below the open rear end of said tube and extending longitudinally of the mold for a distance less than the length of the mold for receiving paving material fed into said mold by said feed means and cooperating with said feed means to distribute the paving material throughout the confined space within said mold and to compact the paving material in said mold to substantially uniform density.

3. The structure set forth in claim 2 wherein said mold has a height exceeding its width, and wherein said distributing and compacting means comprises at least one auxiliary auger disposed beneath said open rear end of said feed tube.

4. The structure set forth in claim 2 wherein said distributing and compacting auger means comprises a plurality of auxiliary augers substantially uniformly distributed throughout the portion of the cross-sectional area of said mold below said open rear end of said feed tube.

5. The structure recited in claim 2 wherein said mold has a height exceeding its width, and wherein said distributing and compacting auger means comprises a pair of vertically spaced auxiliary augers disposed beneath said open rear end of said feed tube, said feed means and said auxiliary augers being substantially uniformly distributed throughout the cross-sectional area of said mold.

6. The structure recited in claim 2 wherein said mold is substantially L-shaped in cross-section having a vertical portion and a horizontal portion for forming a strip of paving material defining a combination curb and gutter, wherein said open rear end of said feed tube communicates with said mold in said vertical portion, and wherein said distributing and compacting auger means comprises a pair of horizontally spaced auxiliary augers disposed in said horizontal portion of the L-shaped cross-section of said mold.

7. Apparatus for forming raised strips of paving material of substantially uniform density on a surface, said apparatus comprising (a) an elongate frame, (b) an open bottom hopper mounted on said frame into which paving material is adapted to be placed, (c) at least one horizotnally disposed feed tube carried by said frame and extending longitudinally thereof, the forward end portion of said tube being disposed below the hopper and communicating therewith and the rear end of said tube being open, (d) an elongate mold mounted on said frame rearwardly of said hopper and having top and side walls defining a confined space open at the bottom and rear end thereof and having a width greater than the height thereof defining a cross-sectional configuration corresponding to the desired configuration of the raised strips of paving material and a cross-sectional area materially greater than the cross-sectional area of said tube, said mold communicating with the open rear end of said tube between the top wall and open bottom thereof and at a medial portion thereof, (e) feed means disposed in said tube for feeding paving material from said hopper into said mold under pressure, and (f) distributing and compacting auger means disposed within said confined space in said mold and laterally offset from and on opposite sides of the open rear end of said tube and extending longitudinally of the mold for a distance less than the length of the mold for receiving paving material fed into said mold by said feed means and cooperating with said feed means to distribute the paving material throughout the confined space within said mold and to compact the paving material in said mold to substantially uniform density.

8. The structure set forth in claim 7 wherein a pair of contiguous feed tubes extend between the open bottom of said hopper and said mold and communicate with said hopper and each other at the forward end portions thereof, wherein said feed means comprises a pair of counter rotatable augers disposed in said tubes, and wherein said distributing and compacting auger means comprises at least one auxiliary auger on each side of the open rear ends of said pair of feed tubes, said feed augers and said auxiliary augers being substantially uniformly distributed throughout the cross-sectional area of said mold.

9. The structure recited in claim 8 wherein a pair of auxiliary augers are disposed on each side of said open rear ends of said feed tubes.

10. The structure set forth in claim 8 wherein said mold is substantially L-shaped in cross-section having a vertical portion and a horizontal portion for forming a combined curb and gutter, wherein said feed tubes communicate with said mold in a medial portion of the horizontal portion of the L-shaped cross-section thereof and wherein an auxiliary auger is disposed in said horizontal portion on one side of said feed tubes and an auxiliary auger is disposed in said vertical portion on the other side of said feed tubes.

References Cited in the file of this patent
UNITED STATES PATENTS

| | | |
|---|---|---|
| 1,546,155 | Wadsworth | July 14, 1925 |
| 2,458,068 | Fuller | Jan. 4, 1949 |
| 2,508,495 | Consalvo | May 23, 1950 |
| 2,818,790 | Canfield | Jan. 7, 1958 |
| 2,968,836 | Colombo | Jan. 24, 1961 |

FOREIGN PATENTS

| | | |
|---|---|---|
| 397,882 | Great Britain | Sept. 1, 1933 |

UNITED STATES PATENT OFFICE
CERTIFICATE OF CORRECTION

Patent No. 3,137,220                                         June 16, 1964

Roy W. Smith

It is hereby certified that error appears in the above numbered patent requiring correction and that the said Letters Patent should read as corrected below.

Column 3, line 19, for "cross-size" read -- cross-sectional size --; column 4, line 26, for "FIGURE 8" read -- FIGURE 2 --.

Signed and sealed this 20th day of October 1964.

(SEAL)
Attest:

ERNEST W. SWIDER                                                  EDWARD J. BRENNER
Attesting Officer                                                      Commissioner of Patents